United States Patent
Aberle

(10) Patent No.: US 7,219,661 B2
(45) Date of Patent: May 22, 2007

(54) EXHAUST GAS RECIRCULATION MEANS AND PROCESS FOR OPERATION OF THE EXHAUST GAS RECIRCULATION MEANS

(75) Inventor: Werner Aberle, Leiferde (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/221,825

(22) Filed: Sep. 9, 2005

(65) Prior Publication Data

US 2006/0054148 A1  Mar. 16, 2006

(30) Foreign Application Priority Data

Sep. 14, 2004  (DE) ........................ 10 2004 044 895

(51) Int. Cl.
*F02M 25/07* (2006.01)
*F02B 47/08* (2006.01)
*F02B 29/04* (2006.01)
*F02B 33/44* (2006.01)

(52) U.S. Cl. ................. 123/568.12; 60/605.2; 60/599; 60/563

(58) Field of Classification Search .......... 123/568.11, 123/568.12, 568.21, 568.23, 568.24, 563; 60/599, 605.2, 278, 279, 311; 165/103
See application file for complete search history.

(56) References Cited

U.S. PATENT DOCUMENTS

| 5,617,726 | A * | 4/1997 | Sheridan et al. | 123/568.12 |
|---|---|---|---|---|
| 5,806,308 | A * | 9/1998 | Khair et al. | 60/278 |
| 6,167,703 | B1 * | 1/2001 | Rumez et al. | 60/599 |
| 6,427,436 | B1 * | 8/2002 | Allansson et al. | 123/568.12 |
| 6,786,210 | B2 * | 9/2004 | Kennedy et al. | 123/568.12 |
| 6,857,263 | B2 * | 2/2005 | Gray et al. | 60/278 |
| 7,007,680 | B2 * | 3/2006 | Tussing et al. | 123/568.12 |
| 7,043,914 | B2 * | 5/2006 | Ishikawa | 60/605.2 |
| 2005/0172613 | A1 * | 8/2005 | Blomquist | 60/278 |

FOREIGN PATENT DOCUMENTS

DE  40 07 516 C2  9/1991

(Continued)

*Primary Examiner*—Willis R. Wolfe, Jr.
(74) *Attorney, Agent, or Firm*—Arnold International; Bruce Y. Arnold

(57) ABSTRACT

The invention relates to an exhaust gas recirculation means 1 for an internal combustion engine 2 with an air supply line 12 which has an air cooler 13 and which is connected to the air inlet 10 of the internal combustion engine 2, and with an exhaust pipe 14 which is connected to the exhaust gas outlet 11 of the internal combustion engine 2, the exhaust pipe 14 being connected by way of a closable exhaust gas recirculation line 16 to the air supply line 12, and the exhaust gas recirculation line 16 being connected in the flow direction to the air supply line 12 upstream from the air cooler 13. Furthermore the invention relates to a process for operating such an exhaust gas recirculation means 1. To improve the dynamics of the internal combustion engine 2, for the exhaust gas recirculation means 1 it is proposed that the air cooler 13 has a bypass air line 31. With respect to the process for operating the exhaust gas recirculation means 1 it is proposed that in the aforementioned exhaust gas recirculation means 1, when the exhaust gas recirculation line 16 is at least partially opened, the bypass air line 31 is at least partially opened and the cooler supply 35 is closed.

24 Claims, 2 Drawing Sheets

FOREIGN PATENT DOCUMENTS

Figure 1:
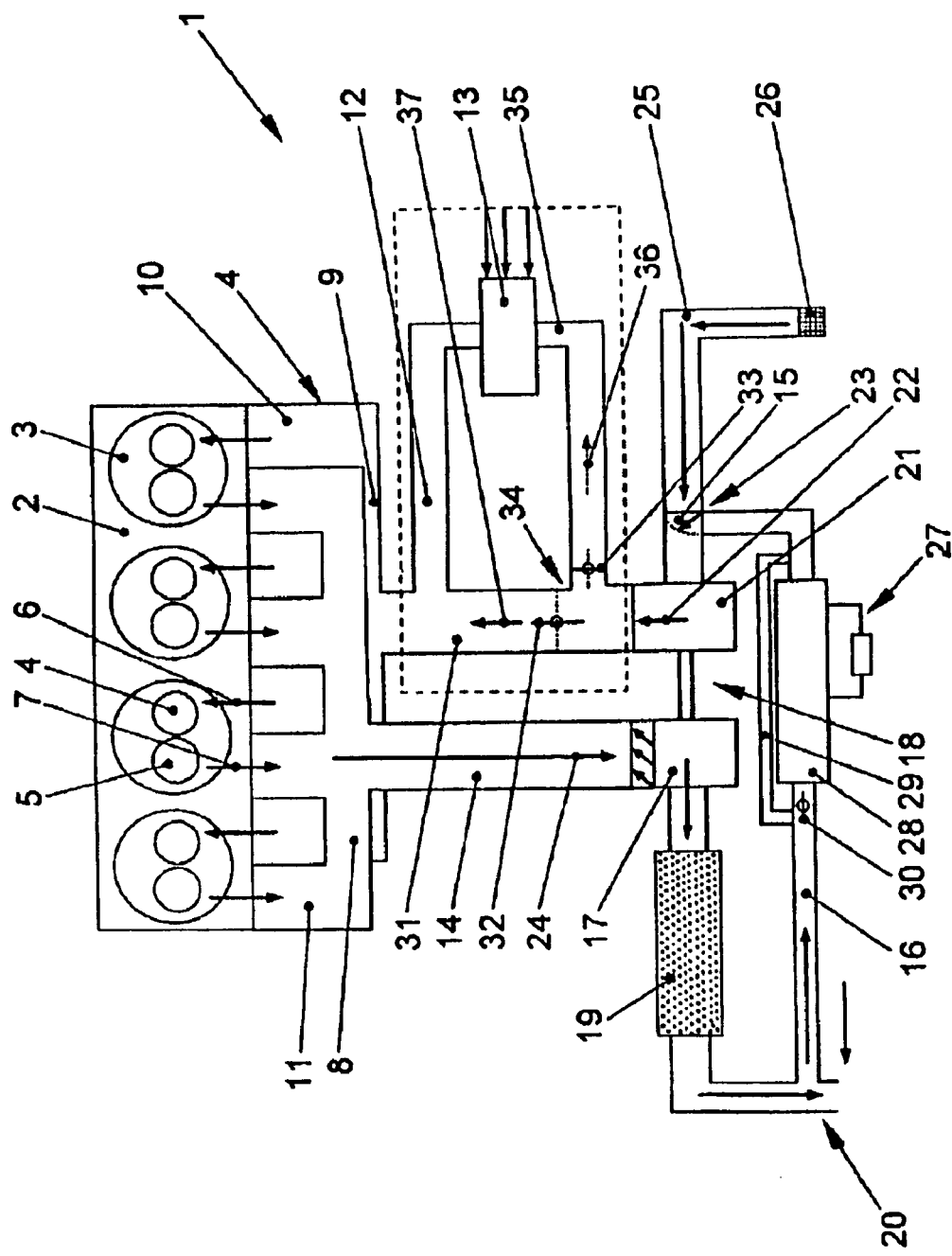

| | | |
|---|---|---|
| DE | 44 39 940 A1 | 5/1996 |
| DE | 197 28 353 C1 | 9/1998 |
| EP | 1 275 838 A1 | 1/2003 |
| WO | WO 98/55759 | 12/1998 |
| WO | WO 00/28203 | 5/2000 |
| WO | WO 02/10574 A1 | 2/2002 |

* cited by examiner

EXHAUST GAS RECIRCULATION MEANS AND PROCESS FOR OPERATION OF THE EXHAUST GAS RECIRCULATION MEANS

The invention relates to an exhaust gas recirculation means for an internal combustion engine with an air supply line which has an air cooler and which is connected to the air inlet of the internal combustion engine, and with an exhaust pipe which is connected to the exhaust gas outlet of the internal combustion engine, the exhaust pipe being connected by way of an exhaust gas recirculation line to the air supply line, and the exhaust gas recirculation line being connected in the flow direction to the air supply line upstream from the air cooler. Furthermore, the invention relates to a process for operating the aforementioned exhaust gas recirculation means.

Such an aforementioned exhaust gas recirculation means is known from WO 00/28203 A1 as a low pressure exhaust gas recirculation system with a particle filter for an internal combustion engine which has a turbocharger, a diesel engine in particular. The recirculation line for the exhaust gas discharges here upstream from the compressor of the turbocharger into an inlet air channel which has a choke in the valve device. The choke can be moved between the open and the closed position into any intermediate position in order to mix the desired amount of fresh air with the recirculated exhaust gas. There is an air cooler through which flow takes place continuously in operation of the internal combustion engine in the flow path for fresh air or optionally the fresh air-exhaust gas mixture between the compressor and the internal combustion engine.

A similar exhaust gas recirculation means for an internal combustion engine is furthermore disclosed in WO 98/55759 A1 as a low pressure exhaust gas recirculation system, a back pressure valve being provided which is located downstream from the branch of a exhaust gas recirculation line. The back pressure valve is designed to be used to produce a sufficient differential pressure between the inlet of the compressor and a filter. In operation of the internal combustion engine the fresh air-exhaust gas mixture which is taken in continuously flows through an air cooler which is connected upstream from the intake tube of the internal combustion engine.

Furthermore, DE 40 07 516 C2 discloses a low pressure exhaust gas recirculation system for a diesel engine, there being a particle filter located downstream from the exhaust gas turbine of a turbocharger and downstream from which an exhaust gas recirculation line which discharges into an intake air line branches off. The intake air line upstream from the mouth of the exhaust gas recirculation line has a controllable choke. The intake air line undergoes transition by way of the charger of the turbocharger into a charging air line which is connected to the diesel engine. In the charging air line there is a charging air cooler through which flow takes place in operation of the diesel engine.

A piston internal combustion engine for executing the process for reducing $NO_x$ emission is described in DE 44 39 940 A1. This piston internal combustion engine has an exhaust gas turbocharger and a means for recirculation of a partial amount of exhaust gas to the charging air. There is an exhaust gas recirculation line which is connected to the exhaust pipe in the area upstream from the turbine of the exhaust gas turbocharger and with a charging air line in the intake area of the compressor of the exhaust gas turbocharger. Furthermore, there are a particle filter and a cooler in the exhaust gas recirculation line. On the pressure side a charging air cooler is connected downstream from the compressor in the charging air line so that cooled and compressed air is supplied by way of the intake manifold of the piston internal combustion engine.

DE 197 28 353 C1 discloses an internal combustion engine with an exhaust gas turbocharger which has an exhaust gas turbine located in the exhaust pipe system, and a charging air compressor which is located in the fresh air supply and which is driven by the exhaust gas turbine. Moreover there is an exhaust gas recirculation line which branches out from the exhaust pipe system in the exhaust gas flow direction downstream from the exhaust gas turbine and discharges into the fresh air supply in the flow direction downstream from the charging air compressor into the charging air line of the fresh air supply. In the exhaust gas recirculation line there is a three-way mixer which has a first input for the exhaust gas recirculation line, a second input which is connected to the fresh air supply, and one output from which an exhaust gas charging line returns to the charging air line. In the charging air line there is a charging air cooler, and the exhaust gas charging line discharges in the flow direction upstream or downstream from the charging air cooler into the charging air line.

An exhaust gas cooler with a bypass pipe and an exhaust gas recirculation valve is disclosed in WO 02/10574 A1. The exhaust gas cooler is designed for use in an exhaust gas recirculation system of an internal combustion engine. Exhaust gas can flow either through the exhaust gas cooler and can be cooled in the process or it can flow through the bypass pipe, with cooling thus being avoided.

In addition, EP 1 275 838 A1 discloses an exhaust gas recirculation system for an engine which has a cooler for exhaust gas, a bypass which bypasses the cooler, a cooler valve, and a bypass valve. Using the cooler it is to be possible to set the temperature of the exhaust gas as a function of the operating state of the engine.

The disadvantage in the exhaust gas recirculation means known from the prior art with an air cooler connected upstream from the internal combustion engine is that fresh air which is continuously supplied and/or exhaust gas which is continuously recirculated by the internal combustion engine during its operation flows through the air cooler in operation of the internal combustion engine, by which the dynamics of the internal combustion engine are inhibited.

In this context the object of the invention is to execute an exhaust gas recirculation means of the initially mentioned type such that an internal combustion engine provided with such an exhaust gas recirculation means has good dynamic behavior. Moreover the object of the invention is to devise a process for operating such an exhaust gas recirculation means.

The first mentioned object is achieved with an exhaust gas recirculation means of the initially mentioned type in which the air cooler has a bypass air line. The dependent claims relate to especially advantageous developments of the invention.

With such a bypass air line as claimed in the invention which can be turned on and off preferably depending on the load range in which the internal combustion engine is operating, the air volume required at the time can be easily made available very briefly to the internal combustion engine, bypassing the air cooler. Switching of the bypass air line can take place for example by means of butterfly valves and/or valves which close a flow path with very short operating times by way of the air cooler and at the same time open the flow path through the bypass air line. The invention affords the advantage that the fresh air or fresh air-exhaust gas mixture volume which is to be supplied to the internal combustion engine can be kept very small; this enables good response behavior and dynamic behavior of the internal combustion engine. If necessary the amount of fuel necessary for an acceleration process is immediately supplied by the comparatively small air volume in the intake area of the internal combustion engine. Preferably the air cooler is periodically bypassed in the partial load range of the internal combustion engine. If necessary the air cooler can be connected, for example based on the signal of the electronic control device of the exhaust gas recirculation means, for example in acceleration processes. The invention is very well suited to a low pressure exhaust gas recirculation means, especially for a motor vehicle diesel engine, in which the exhaust gas is added unpressurized or at a simply lower pressure level of the fresh air which is to be supplied to the internal combustion engine. For a low pressure exhaust gas recirculation means there is periodically a comparatively large amount of exhaust gas in the air cooler, when the accelerator is suddenly depressed it can therefore occur that exhaust gas is in the intake area of the internal combustion engine too long and initially the amount of fuel necessary for brisk acceleration cannot be supplied. This problem can be very easily solved with the invention by for example an exhaust gas-fresh air mixture being able to flow basically bypassing the air cooler directly through the bypass air line to the internal combustion engine, conversely in the case of intake of pure fresh air (without added exhaust gas) by the internal combustion engine this fresh air can preferably flow through the air cooler. The invention preferably comprises the entire rpm range of the internal combustion engine, i.e., both the partial load and also full load ranges. The invention generally solves the problem that for exhaust gas recirculation means in the prior art with an air cooler through which the exhaust gas-fresh mixture likewise always flows in the entire range of engine operating characteristics and which is intended for cooling of the air which has been highly compressed in the full load range of the internal combustion engine there is a large mixture volume in an air cooler section, by which the internal combustion engine in these known exhaust gas recirculation means requires too many revolutions to intake the mixture from the air cooler section in order to be able to inject the desired increased amount of fuel (for then pure fresh air), and as a result exhibits undesirable inertia.

The output of the internal combustion engine is advantageously increased when according to one development of the invention in the exhaust pipe in the flow direction upstream from the branch of the exhaust gas recirculation line there is the turbine of the exhaust gas turbocharger for driving the compressor of the exhaust gas turbocharger, which turbine is located in the air supply line in the flow direction downstream from the mouth of the exhaust gas recirculation line and upstream from the air cooler. In a low pressure exhaust gas recirculation means such as this in which the turbine is located upstream from the branch of the exhaust gas recirculation line, all the exhaust gas is routed through the turbine of the exhaust gas turbocharger, by which the maximum drive output of the turbine is effected and thus the overall effectiveness of the turbocharger is increased; for example, the turbocharger rpm in the partial load range (EGR range) can be greatly increased compared to a high pressure EGR means, for example doubled. The exhaust gas in the exhaust gas recirculation line is then at least virtually unpressurized.

According to another advantageous development of the invention the pollutant emissions of the internal combustion engine are additionally lowered when there is a particle filter in the exhaust pipe in the flow direction upstream from the branch of the exhaust gas recirculation line.

It is advantageous for further increasing the output of the internal combustion engine if according to another development of the invention the exhaust gas recirculation line has an exhaust gas cooler. Condensation water which may form in exhaust gas cooling can be easily discharged in the exhaust gas recirculation line. By means of the exhaust gas cooler moreover a major reduction of the pollutant emissions of the internal combustion engine, especially $NO_x$ output, can be achieved.

It is especially advantageous for improving the cold starting behavior of the internal combustion engine if the exhaust gas cooler has an exhaust gas bypass line according to one development of the invention. For a cold start the exhaust gas can then be routed through the exhaust gas bypass line, and the internal combustion engine reaches its operating temperature at an earlier instant after the cold start. With a suitable configuration of the coolant routing of the exhaust gas cooler a heat-up of the internal combustion engine can consequently also be undertaken.

The exhaust gas cooler could be connected for example to the engine cooling circuit, the exhaust gas being cooled by the engine coolant. According to one advantageous development of the invention the exhaust gas cooler conversely has an exhaust gas cooling circuit which is independent on the engine cooling circuit of the internal combustion engine. Thus the exhaust gas cooler can also be cooled down to temperatures far below 100° C., for example to the ambient temperature. The exhaust gas cooling circuit can be configured for example with water as the coolant, having its own water cooler, or for example can have an air cooler.

It is for example conceivable that the air flow into and in the bypass air line can be controlled by means of a valve. A simplified structure and a reduced wear susceptibility of the exhaust gas recirculation means as claimed in the invention are conversely achieved if according to another advantageous development of the invention the bypass air line has a bypass air butterfly valve. Another advantage of the bypass air butterfly valve consists in that it can be moved very quickly especially from the position which opens the bypass air line into the position which closes the bypass air line.

According to another advantageous development of the invention the air supply line in the flow direction downstream from the branch of the bypass air line and upstream from the air cooler has a cooler air butterfly valve in the cooler supply. In this way the cooler supply can be opened or closed very quickly and reliably.

For simple, low-wear control of the recirculation of the exhaust gas to the internal combustion engine it is especially advantageous if according to another development of the invention the exhaust gas recirculation line has an exhaust gas butterfly valve. At the same time controllable mixing of the recirculated exhaust gas and fresh air which is intaken from the environment can be effected with the exhaust gas butterfly valve.

According to another advantageous development of the invention, the bypass air butterfly valve and/or the cooler air butterfly valve and/or the exhaust gas butterfly valve can be adjusted between a first position which completely closes the bypass air line or the air supply line or the exhaust gas recirculation line and a second position which completely clears the bypass air line or the air supply line or the exhaust gas recirculation line so that the respective line can be not only completely opened and completely closed, but that also any intermediate positions of the respective butterfly valve are possible. The corresponding control of the butterfly valves can be effected for example depending on the instantaneous load range of the internal combustion engine and on other operating parameters such as the temperature of the internal combustion engine.

For exact, reproducible and simple control of the butterfly valves it is especially advantageous if according to another development of the invention there is in particular an electronic control device for adjusting the bypass air butterfly valve and/or the cooler air butterfly valve and/or the exhaust gas butterfly valve.

The object mentioned second in the foregoing is achieved with a process of the initially mentioned type in which when the exhaust gas recirculation line is at least partially opened the bypass air line is at least partially opened and the cooler supply is closed. The dependent claims relate to especially suitable developments of the invention.

In the process as claimed in the invention, when exhaust gas is being recirculated to the air supply line and accordingly to the intake area of the internal combustion engine, that is to say, when the exhaust gas recirculation line is completely or partially closed, for example by an exhaust gas butterfly valve which is in the opened position, the cooler supply is especially completely closed. Therefore no intake air of the internal combustion engine flows by way of the air cooler. The process can be used especially advantageously without reducing the output of the internal combustion engine when in the exhaust gas recirculation line the exhaust gas cooler reduces the temperature level of the exhaust gas. Based on the process as claimed in the invention, in the area relevant to the exhaust gas recirculation the entire, comparatively large-volume air cooler section of the exhaust gas recirculation means is bypassed, and the fresh air-exhaust gas mixture or optionally only the recirculated exhaust gas (in the case of a closed fresh air supply by which ambient air can be intaken by the internal combustion engine) is routed directly into the internal combustion engine. This yields very good dynamics of the internal combustion engine; this is especially important in an internal combustion engine which is used as an engine in a motor vehicle. If in the case, in which exhaust gas is added to the intaken fresh air, the air cooler is bypassed, a high mass flow through the internal combustion engine can be achieved in the dynamic phases.

Essentially, closing of the cooler supply in any manner is conceivable. But it is especially advantageous for a simple process which is very reliable over a long operating interval if the cooler air butterfly valve is closed when the exhaust gas butterfly valve is at least partially opened according to one development of the invention.

According to another advantageous development of the invention the dynamic behavior of the internal combustion engine is further improved if the cooler air butterfly valve is opened when the internal combustion engine accelerates.

The same applies advantageously if according to another development of the invention the cooler air butterfly valve is opened when the internal combustion engine is operating in the full load range.

The invention allows numerous embodiments. To further illustrate its basic principle, examples thereof are shown schematically in the drawings and are described below.

Figure 2:
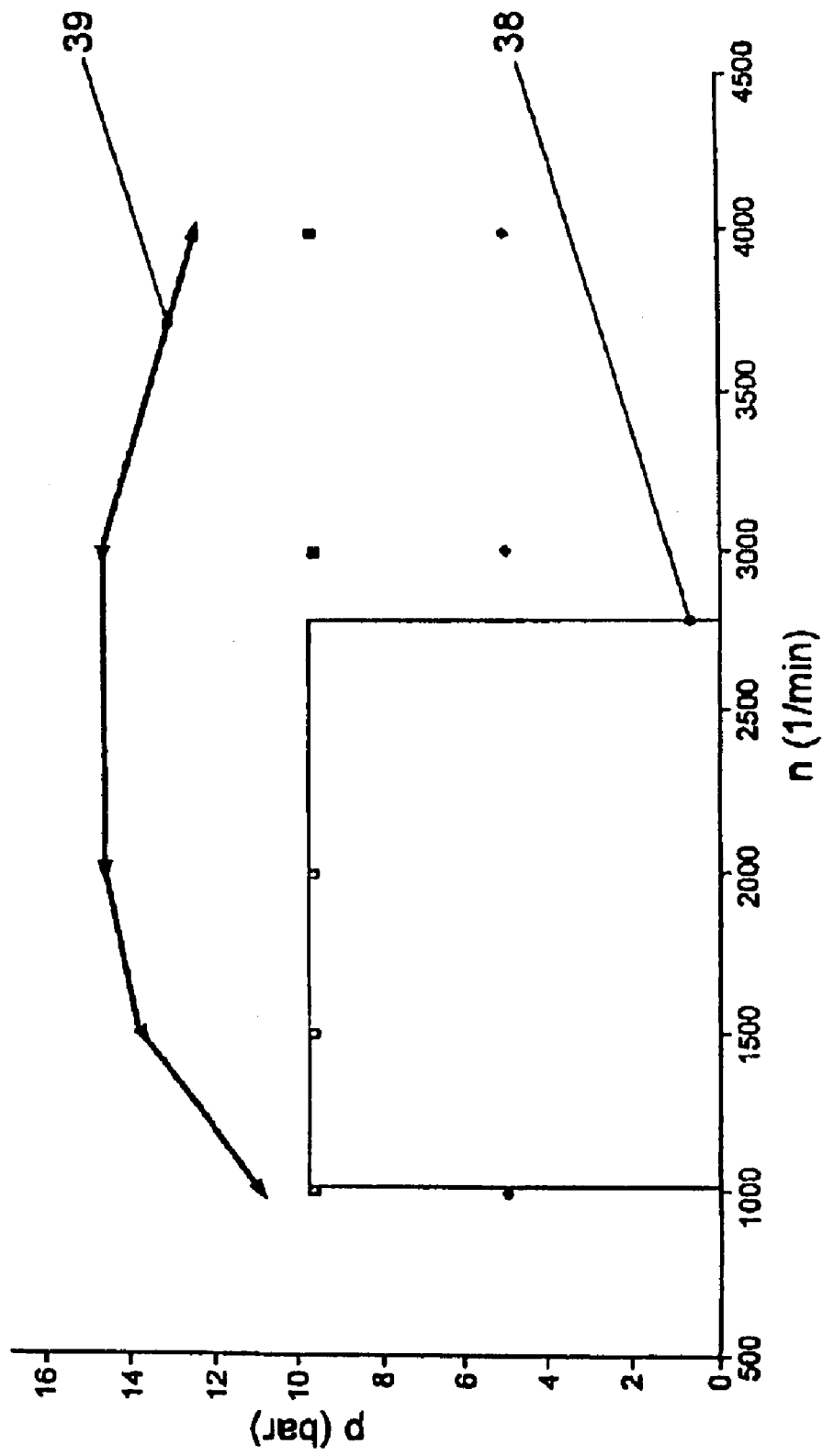

FIG. 1 shows an exhaust gas recirculation means with an air cooler and a bypass air line for the air cooler and FIG. 2 shows the operating region for bypassing the air cooler.

The elements corresponding to one another are provided with the same reference numbers in all figures.

FIG. 1 shows an exhaust gas recirculation means 1 for an internal combustion engine 2 made as a motor vehicle diesel engine with a turbocharger with four cylinders 3. The cylinders 3 each have an inlet valve 4 for intaken air and an outlet valve 5 for expelled exhaust gas. The inlet air flows into the cylinders 3 are symbolized by arrows 6. Accordingly outlet exhaust gas flows from the cylinders 3 are also symbolized by arrows 7. The expelled exhaust gas which emerges through the outlet valves 5 is combined in an exhaust gas manifold 8 of the internal combustion engine 2. Air which is to be supplied to the inlet valves 4 is fanned out in the intake manifold 9 for assignment to the individual inlet valves 4.

The intake manifold 9 is connected to the inlet valves 4 by means of a respective air inlet 10 each and the exhaust manifold 8 is connected to the outlet valves 5 by means of a respective exhaust gas outlet 11 each. An air supply line 12 with an air cooler 13 is connected to the intake manifold 9 and the exhaust pipe 14 of the exhaust gas recirculation means 1 is connected to the exhaust manifold 8. Furthermore, in the exhaust gas recirculation means 1 the exhaust pipe 14 with the air supply line 12 is connected to the exhaust gas recirculation line 16 which can be closed by means of the exhaust gas butterfly valve 15. Instead of the exhaust gas butterfly valve 15, there can also be an exhaust gas recirculation control valve.

The flow direction of the exhaust gas in the exhaust pipe 14 is indicated in FIG. 1 by an arrow 24. The exhaust gas expelled from the internal combustion engine 2 is routed in the exhaust pipe 14 by way of a turbine 17 of the exhaust gas turbocharger 18 and a particle filter 19. Both the turbine 17 and also the particle filter 19 are located upstream from the branch 20 of the exhaust gas recirculation line 16 of the exhaust pipe 14, the particle filter 19 being located downstream from the turbine 17.

The turbine 17 of the exhaust gas turbocharger 18 drives the compressor 12 of the exhaust gas turbocharger 18, the compressor 21 being located in the air supply line 12 in the flow direction of the air supplied to the internal combustion engine 2 symbolized by the arrow 22 downstream from the mouth 23 of the exhaust gas recirculation line 16 into the air supply line 12. The exhaust gas butterfly valve 15 is located in the area of the mouth 23 of the exhaust gas recirculation line 16. Using the exhaust gas butterfly valve 15 either the exhaust gas recirculation line 16 or the fresh air line 25 which is provided with an air mass sensor 26, by way of which ambient air of the motor vehicle can be intaken, and which is a component of the air supply line 12, can be completely closed. Between these two limit positions of the exhaust gas butterfly valve 25 any intermediate position can be set so that only exhaust gas, only fresh air, or an optionally adjustable exhaust gas-fresh air mixture can be supplied to the internal combustion engine 2.

In the exhaust gas recirculation line 16 there is an exhaust gas cooler 28 for cooling the recirculated exhaust gas; it has an exhaust gas cooling circuit 27 which is independent of the engine cooling circuit of the internal combustion engine 2 which is not shown here. An exhaust gas bypass line 29 runs parallel to the exhaust gas cooler 28. By means of an exhaust gas cooler bypass butterfly valve 30 which is located in the flow direction upstream from the exhaust gas cooler 28, in the exhaust gas recirculation line 16 the exhaust gas cooler 28 can be blocked so that exhaust gas cannot flow through it.

The air cooler 13 in the air supply line 12 has a bypass air line 31 with a bypass air butterfly valve 32. The bypass air butterfly valve 32 in the bypass air line 31 corresponds to a cooler air butterfly valve 33 which is located downstream from the branch 34 of the bypass air line 31 of the air supply line 12 in a cooler supply 35 of the air supply line 12 upstream from the air cooler 13.

Depending on the position of the bypass air butterfly valve 32 and the cooler air butterfly valve 33, the air supplied to the internal combustion engine 2 takes a different path: if the bypass air butterfly valve 32 is completely closed and the cooler air butterfly valve 33 is completely opened (each shown by a dotted line) all the air flows in the flow direction symbolized by a dotted arrow 36 by way of the air cooler 13 to the intake manifold 9 of the internal combustion engine 2; if conversely the bypass air butterfly valve 32 is completely opened and the cooler air butterfly valve 33 is completely closed (each shown by a solid line), all the air flows in the flow direction symbolized by the arrow 37 with the solid line, bypassing the air cooler 13, to the intake manifold 9. Essentially intermediate positions of the bypass air butterfly valve 32 and/or the cooler air butterfly valve 33 are also conceivable.

For example in acceleration processes of the internal combustion engine 2 or in general during its operation in the full load range, that is, for example when large amounts of fuel are being injected and charging pressures are elevated, when cooling of the air intaken by the internal combustion engine 2 becomes necessary, thus after a very short time offset during which the internal combustion engine 2 draws through the intake air between the bypass air butterfly valve 32 and the inlet valves 4 of the internal combustion engine 2, switching over from the bypass air butterfly valve 32 and the cooler air butterfly valve 33 can take place; the compressed air then flows through the air cooler 13. When the internal combustion engine 2 again leaves the full load range, then depending on the triggered amount of injection the aforementioned valves can be repositioned again. After a very short time in which the shortened intake section is again filled with exhaust gas, a partial load amount of fuel can be injected again, the exhaust gas butterfly valve 15 periodically being at least partially opened.

For example, FIG. 2 shows the operating range for bypassing the air cooler in an exhaust gas recirculation means as shown in FIG. 1. In FIG. 2 the indicated mean effective pressure p is plotted over the rpm n. A rectangle 38 indicates the range of operating characteristics of exhaust gas recirculation in which the internal combustion engine is operated in the exhaust gas recirculation mode. In the process the exhaust gas-fresh air mixture is routed directly into the intake manifold of the internal combustion engine, bypassing the air cooler. The size of the rectangle 38 is generally dependent on numerous specific boundary conditions such as the size of the motor vehicle and the cubic capacity of the internal combustion engine. The curve 39 indicates the full load range in which the internal combustion engine is operated in an air cooling mode in which here only intaken fresh air (that is to say, ambient air of the motor vehicle) is supplied to the internal combustion engine by way of the air cooler.

The invention claimed is:

1. An exhaust gas recirculation means for an internal combustion engine with an air supply line which has an air cooler and which is connected to the air inlet of the internal combustion engine, and with an exhaust pipe which is connected to the exhaust gas outlet of the internal combustion engine, the exhaust pipe being connected by way of an exhaust gas recirculation line to the air supply line, and the exhaust gas recirculation line being connected in the flow direction to the air supply line upstream from the air cooler, characterized in that the air cooler (13) has a bypass air line (31);

wherein
in the exhaust pipe (14) in the flow direction upstream from the branch (20) of the exhaust gas recirculation line (16) there is the turbine (17) of the exhaust gas turbocharger (18) for driving the compressor (21) of the exhaust gas turbocharger (18), which compressor is located in the air supply line (12) in the flow direction downstream from the mouth (23) of the exhaust gas recirculation line (16) and upstream from the air cooler (13); and the air supply line (12) in the flow direction downstream from the branch (34) of the bypass air line (31) and upstream from the air cooler (13) has a cooler air butterfly valve (33) in the cooler supply (35).

2. The exhaust gas recirculation means as claimed in claim 1, wherein in the exhaust pipe (14) in the flow direction there is a particle filter (19) upstream from the branch (20) of the exhaust gas recirculation line (16).

3. The exhaust gas recirculation means as claimed in claim 1, wherein in the exhaust pipe (14) in the flow direction there is a particle filter (19) upstream from the branch (20) of the exhaust gas recirculation line (16).

4. The exhaust gas recirculation means as claimed in claim 1, wherein the bypass air butterfly valve (32) and/or the cooler air butterfly valve (33) and/or the exhaust gas butterfly valve (15) each can be adjusted between a first position which completely closes the bypass air line (31) or the air supply line (12) or the exhaust gas recirculation line (16) and a second position which completely clears the bypass air line (31) or the air supply line (12) or the exhaust gas recirculation line (16).

5. The exhaust gas recirculation means as claimed in claim 1, wherein there is a control device for adjusting the bypass air butterfly valve (32) and/or the cooler air butterfly valve (33) and/or the exhaust gas butterfly valve (15).

6. The exhaust gas recirculation means as claimed in claim 1, wherein the exhaust gas recirculation line (16) has an exhaust gas butterfly valve (15).

7. The exhaust gas recirculation means as claimed in claim 6, wherein the bypass air butterfly valve (32) and/or the cooler air butterfly valve (33) and/or the exhaust gas butterfly valve (15) each can be adjusted between a first position which completely closes the bypass air line (31) or the air supply line (12) or the exhaust gas recirculation line (16) and a second position which completely clears the bypass air line (31) or the air supply line (12) or the exhaust gas recirculation line (16).

8. The exhaust gas recirculation means as claimed in claim 6, wherein there is a control device for adjusting the bypass air butterfly valve (32) and/or the cooler air butterfly valve (33) and/or the exhaust gas butterfly valve (15).

9. The exhaust gas recirculation means as claimed in claim 1, wherein the exhaust gas recirculation line (16) has an exhaust gas cooler (28).

10. The exhaust gas recirculation means as claimed in claim 9, wherein the exhaust gas cooler (28) has an exhaust gas cooling circuit (27) which is independent of the engine cooling circuit of the internal combustion engine (2).

11. The exhaust gas recirculation means as claimed in claim 9, wherein the exhaust gas cooler (28) has an exhaust gas bypass line (29).

12. The exhaust gas recirculation means as claimed in claim 11, wherein the exhaust gas cooler (28) has an exhaust gas cooling circuit (27) which is independent of the engine cooling circuit of the internal combustion engine (2).

13. The exhaust gas recirculation means as claimed in claim 1, wherein the bypass air line (31) has a bypass air butterfly valve (32).

14. The exhaust gas recirculation means as claimed in claim 13, wherein there is a control device for adjusting the bypass air butterfly valve (32) and/or the cooler air butterfly valve (33) and/or the exhaust gas butterfly valve (15).

15. The exhaust gas recirculation means as claimed in claim 13, wherein the bypass air butterfly valve (32) and/or the cooler air butterfly valve (33) and/or the exhaust gas butterfly valve (15) each can be adjusted between a first position which completely closes the bypass air line (31) or the air supply line (12) or the exhaust gas recirculation line (16) and a second position which completely clears the bypass air line (31) or the air supply line (12) or the exhaust gas recirculation line (16).

16. The exhaust gas recirculation means as claimed in claim 15, wherein there is a control device for adjusting the bypass air butterfly valve (32) and/or the cooler air butterfly valve (33) and/or the exhaust gas butterfly valve (15).

17. A process for operating the exhaust gas recirculation means as set forth in claim 1 wherein, when the exhaust gas recirculation line (16) is at least partially opened, the bypass air line (31) is at least partially opened and the cooler supply (35) is closed.

18. The process as claimed in claim 17 wherein, when the internal combustion engine (2) is operating in the full load range, the cooler air butterfly valve (33) is opened.

19. The process as claimed in claim 17 wherein, when the internal combustion engine (2) is accelerating, the cooler air butterfly valve (33) is opened.

20. The process as claimed in claim 19 wherein, when the internal combustion engine (2) is operating in the full load range, the cooler air butterfly valve (33) is opened.

21. The process as claimed in claim 17 wherein, when the exhaust gas butterfly valve (15) is at least partially opened, the cooler air butterfly valve (33) is closed.

22. The process as claimed in claim 21 wherein, when the internal combustion engine (2) is operating in the full load range, the cooler air butterfly valve (33) is opened.

23. The process as claimed in claim 21 wherein, when the internal combustion engine (2) is accelerating, the cooler air butterfly valve (33) is opened.

24. The process as claimed in claim 23 wherein, when the internal combustion engine (2) is operating in the full load range, the cooler air butterfly valve (33) is opened.

* * * * *